US011895991B2

(12) United States Patent
Schmidt

(10) Patent No.: US 11,895,991 B2
(45) Date of Patent: Feb. 13, 2024

(54) AQUARIUM SKIMMER DEVICES, SYSTEMS, AND METHODS

(71) Applicant: Robert Douglas Schmidt, San Diego, CA (US)

(72) Inventor: Robert Douglas Schmidt, San Diego, CA (US)

(*) Notice: Subject to any disclaimer, the term of this patent is extended or adjusted under 35 U.S.C. 154(b) by 0 days.

(21) Appl. No.: 17/455,781

(22) Filed: Nov. 19, 2021

(65) Prior Publication Data

US 2022/0159937 A1  May 26, 2022

Related U.S. Application Data

(60) Provisional application No. 63/116,545, filed on Nov. 20, 2020.

(51) Int. Cl.
| | | |
|---|---|---|
| *A01K 63/04* | (2006.01) | |
| *B01D 24/20* | (2006.01) | |
| *C02F 1/00* | (2023.01) | |
| *C02F 1/40* | (2023.01) | |
| *B01D 35/26* | (2006.01) | |
| *E02B 15/10* | (2006.01) | |
| *B01D 29/085* | (2006.01) | |

(52) U.S. Cl.
CPC .......... *A01K 63/045* (2013.01); *B01D 24/205* (2013.01); *B01D 29/085* (2013.01); *B01D 35/26* (2013.01); *C02F 1/001* (2013.01); *C02F 1/40* (2013.01); *E02B 15/106* (2013.01)

(58) Field of Classification Search
CPC .... A01K 63/045; B01D 24/205; B01D 35/26; C02F 1/001; C02F 1/40; E04H 4/1263; E02B 15/106
See application file for complete search history.

(56) References Cited

U.S. PATENT DOCUMENTS

| | | | |
|---|---|---|---|
| 3,567,020 A | 3/1971 | Whitaker | |
| 3,616,916 A | 11/1971 | Greene | |
| 4,212,740 A | 7/1980 | Greene | |
| 4,325,150 A | 4/1982 | Buddy | |
| 5,133,854 A | 7/1992 | Horvath | |
| 5,581,826 A | 12/1996 | Edwards | |
| 5,830,350 A | 11/1998 | Voss | |
| 6,007,713 A * | 12/1999 | Michalik | A01K 63/045 210/416.2 |
| 6,224,753 B1 | 5/2001 | Marbach | |
| 6,709,582 B2 | 3/2004 | Danner | |
| 7,727,387 B2 | 6/2010 | Goggin | |
| 8,721,881 B1 | 5/2014 | Smith | |
| 8,728,307 B2 | 5/2014 | Iacovacci | |

(Continued)

*Primary Examiner* — Liam Royce
(74) *Attorney, Agent, or Firm* — Knobbe Martens Olson & Bear LLP

(57) ABSTRACT

An aquarium skimmer device can include a filter body that attaches to a water pump, filter, or power head, wherein the filter body is configured to hold a filter medium for filtering water that passes through the filter body. The skimmer device can also include a funnel holder that attaches to a top of the filter body, and a funnel assembly comprising a funnel. The funnel assembly can be received by the funnel holder and configured to float up and down with respect to the funnel holder with changes in water level, and a wide opening of the funnel is positioned one inch or less below a surface of the water.

8 Claims, 5 Drawing Sheets

(56) References Cited

U.S. PATENT DOCUMENTS

| | | |
|---|---|---|
| 9,581,478 B1 | 2/2017 | Smith |
| 9,879,439 B2 | 1/2018 | Norberto, III |
| 9,945,139 B2 | 4/2018 | Norberto, III et al. |
| 10,260,247 B2 | 4/2019 | Norberto, III et al. |
| 2003/0196941 A1* | 10/2003 | Danner ................ A01K 63/045 210/170.02 |
| 2007/0163933 A1 | 7/2007 | Goggin |
| 2014/0202941 A1 | 7/2014 | Iacovacci |
| 2014/0209546 A1 | 7/2014 | Smith |
| 2015/0247332 A1 | 9/2015 | Norberto, III |
| 2015/0272090 A1* | 10/2015 | Schaumburg ........... C02F 3/348 210/167.25 |

* cited by examiner

AQUARIUM SKIMMER DEVICES, SYSTEMS, AND METHODS

INCORPORATION BY REFERENCE TO ANY PRIORITY APPLICATIONS

This application claims priority to U.S. Provisional Patent Application No. 63/116,545, filed Nov. 20, 2020, which is incorporated herein by reference. Any and all applications for which a foreign or domestic priority claim is identified in the Application Data Sheet as filed with the present application are hereby incorporated by reference under 37 CFR 1.57.

U.S. patent application Ser. No. 16/516,021, filed Jul. 18, 2019, and now issued as U.S. Pat. No. 10,876,312; U.S. patent application Ser. No. 16/516,030, filed Jul. 18, 2019, and now issued as U.S. Pat. No. 10,876,313; U.S. patent application Ser. No. 16/516,013, filed Jul. 18, 2019, and now issued as U.S. Pat. No. 10,876,311; U.S. patent application Ser. No. 16/983,508, filed Aug. 3, 2020, and now published as U.S. Pub. No. 2021/0062527; and U.S. patent application Ser. No. 17/443,155, filed Jul. 21, 2021 are each incorporated herein by reference.

BACKGROUND

Field

This application relates to aquarium skimmer devices, systems, and methods.

Description

Aquariums are enjoyed by many in both private and public settings and may be stocked with plants, corals, and/or salt or freshwater fish. Aquariums may also provide an environment in which to keep turtles. To provide healthy conditions and maximum sustainability, it is important to ensure that water within an aquarium remains clean, clear, and free from floating debris and oils. For this reason, aquariums generally include circulation and filtration systems that are designed to clean the water.

Many aquariums accumulate unwanted floating debris, such as food, parts of plants, oils and algae, on the surface of the water. Commonly, existing circulation and filtration systems may be ineffective at removing this debris from the water's surface.

SUMMARY

An aquarium skimmer device is disclosed. The device can include a funnel that raises up to just below the water surface, which comprises a larger opening near the water surface and a narrow opening at the opposite end. The funnel can be placed in a funnel sleeve that allows it to freely move up and down the funnel holder that is attached to a filter body. The filter body can be round and can be configured to allow the water flowing through the large funnel opening that is just beneath the water surface and out the narrow opening at the opposite end of the funnel to travel though the body, which may contain filter media, and into a water pump (power head) that then exhausts the clean treated water back into the aquarium.

The device can include one or more of the following features in any combination: (a) wherein the funnel self-adjust to be just below the water surface, which allows it pull in enough water to not blow bubbles, but not so much that the water does not fall into the skimmer device; (b) wherein the funnel may have a gradual slope at the large opening and a near vertical slope near the narrow opening; (c) wherein a funnel ring at the bottom of the sleeve that may fit closer than the sleeve to the funnel holder; (d) wherein the ring may have a thin, flat radial ring that helps funnel resist rapid changes in depth; (e) wherein the funnel ring may have tabs that allow the sleeve to travel in grooves on the funnel holder; (f) wherein the funnel holder may have vertical grooves that allow a small amount of water to travel under the funnel into the device; (g) wherein the grooves may provide tracks in which the tabs of the funnel ring may travel; (h) and these grooves may also allow the funnel to lock onto the funnel holder, as they may be shaped like the letter J, so the funnel will slide onto one side, but not able to lift off the other; (i) wherein the filter body may contain filter media that helps to purify water as it travels through the body; (j) wherein the filter body may contain special media, such as Zeolite (Marineland) or Nitra-Zorb (API) to eliminate contaminates, such as ammonia and nitrates; (k) wherein there may be a screen (floss guard) at the bottom of the body to prevent filter media from entering the power head or water pump; (l) wherein a throat adapter to allow the body to attach to a power head, such as Marineland's Penguin Submersible Power Heads; (m) wherein the device may also attach to a water pump intake, such as the intake of a canister filter or the intake of a submersible magnetic drive pump; (n) wherein the device may accommodate low flows, such as 100 gph, or much larger flows, such as, but not limited to 1200 gph; (o) wherein a stand that allows a power head to attach to it; (p) wherein the stand can attach to the wall of an aquarium via suction cups or magnets; and/or other features as described herein.

In another aspect, an aquarium skimmer device can include: a filter body that attaches to a water pump, filter, or power head, wherein the filter body is configured to hold a filter medium for filtering water that passes through the filter body; a funnel holder that attaches to a top of the filter body; and a funnel assembly comprising a funnel, wherein the funnel assembly is received by the funnel holder and configured to float up and down with respect to the funnel holder with changes in water level, wherein a wide opening of the funnel is positioned one inch or less below a surface of the water.

The device can include one or more of the following features in any combination: (a) wherein the funnel self-positions relative to the surface of the water; (b) wherein the wide opening of the funnel may raise above the surface of the water when the water pump, filter, or power head is deactivated, thus disallowing debris in the filter body from escaping the filter body; (c) grooves in the funnel holder configured to stabilize the funnel assembly; (d) wherein there are grooves in the funnel holder that allow the funnel assembly to ride in the grooves, so the funnel assembly can be locked onto the funnel holder; (e) an attachment device configured to attach to an aquarium wall; (f) wherein the attachment device comprises a magnetic attachment device; (g) the water pump, filter, or power head, and wherein the water pump, filter, or power head includes an intake that is attached to an outlet of the filter body; and/or other features as described herein.

In another aspect, an aquarium skimmer method includes: positioning a skimmer device in an aquarium, the skimmer device comprising: a filter body that attaches to a water pump, filter, or power head, wherein the filter body is configured to hold a filter medium for filtering water that passes through the filter body; a funnel holder that attaches to a top of the filter body; and a funnel assembly comprising a funnel, wherein the funnel assembly is received by the funnel holder and configured to float up and down with respect to the funnel holder with changes in water level, wherein a wide opening of the funnel is positioned one inch or less below a surface of the water; and pumping water through the skimmer device using the water pump, filter, or power head.

The method can include one or more of the following features in any combination: (a) wherein the funnel self-positions relative to the surface of the water; (b) wherein the wide opening of the funnel may raise above the surface of the water when the water pump, filter, or power head is deactivated, thus disallowing debris in the filter body from escaping the filter body; (c) comprising grooves in the funnel holder configured to stabilize the funnel assembly; (d) wherein there are grooves in the funnel holder that allow the funnel assembly to ride in the grooves, so the funnel assembly can be locked onto the funnel holder; (e) using an attachment device to attach the skimmer device to an aquarium wall; (f) wherein the attachment device comprises a magnetic attachment device; (g) wherein the skimmer device further comprises the water pump, filter, or power head, and wherein the water pump, filter, or power head includes an intake that is attached to an outlet of the filter body; and/or other features as described herein.

BRIEF DESCRIPTION OF THE DRAWINGS

The features and advantages of the aquarium skimmer device, systems, and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components unless context dictates otherwise. The drawings may not be to scale.

DETAILED DESCRIPTION

This application relates to devices, systems, and methods that are configured to clean an aquarium. The devices, systems, and methods may be configured, in some embodiments, to clean debris, such as food, decaying leaves, oils, etc., from the surface of the water in an aquarium. As will be described in greater detail below, the devices, systems, and methods may be configured to use the surface tension of the water to pull in debris from the surface of the water.

Figure 1:
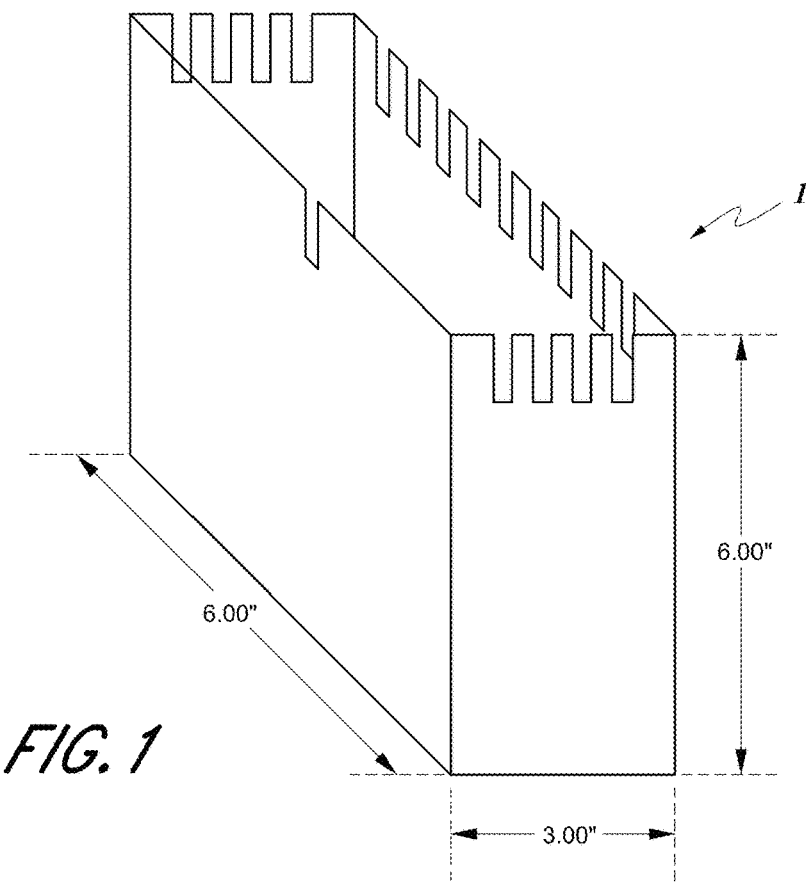
FIG. 1 is a perspective view illustrating one example of a water overflow skimmer that can be placed within an aquarium.

Generally, aquariums can include surface skimmers in an effort to clear the surface of the water from debris. An example of such a skimmer is shown in FIG. 1. These skimmers are often referred to as overflow skimmers. These skimmers (for example, as shown in FIG. 1), however, may not work effectively, and are generally limited to only cleaning the surface of the water of debris. For example, with such a skimmer, the slots in which the water flows into the basket are of a fixed depth and length. As an example, if the slots are one half inch in length and extend above the surface water by one quarter of an inch, then if the water level in the aquarium decreases by more than one quarter inch, then the water cannot flow into through slots and the skimmer ceases to work. On the other hand, if the slots are longer, then water other than surface water can enter the filter basket. Also, with these types of overflow skimmers, it is difficult to replace the filter media or to quickly add remedying media, such as Marineland's NeoZorb.

Figure 2:
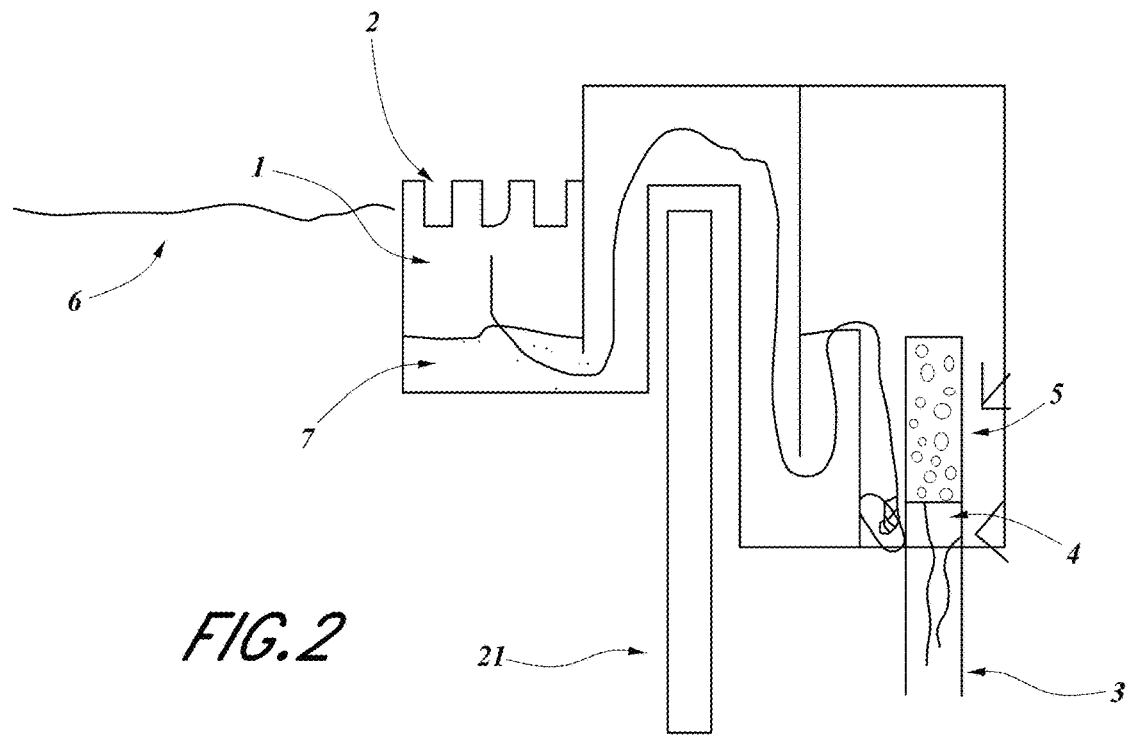
FIG. 2 is cross-section view of an example water overflow skimmer placed within an aquarium.

FIG. 2 illustrates another example of an aquarium overflow skimmer 1 placed and working within an aquarium. As shown in FIG. 2, the water level 6 within the tank must be below the top of the intake slots 2 and above the bottom of the intake slots 2, which allows water to flow into the overflow skimmer 1. In these types of setups, the water usually travels outside of the aquarium wall 21 and is sucked through a siphon into a filter 3 below the aquarium.

Issues with overflow skimmer devices, such as those shown in FIGS. 1 and 2, include one or more of the following: (A) The water level in the tank must be below the top of the intake slots 2 and above the bottom of the intake slots 2 in order for the water to flow into the overflow skimmer device. If the water is too high, then too much water enters and if it is too low, then not enough water enters. (B) The water in overflow skimmer devices usually travels out of the aquarium and must be pumped back into the aquarium via a sump pump, and if this pump fails then the overflow can be flooded. (C) It can be difficult to place filter media that can quickly adjust the condition of the water into the overflow skimmer device.

The following discussion presents detailed descriptions of the several embodiments of aquarium skimmer devices, systems, and methods shown in FIGS. 3-7. In some embodiments, these skimmer devices provide improved functionality when compared with the overflow skimmer devices shown in FIGS. 1 and 2. Additionally, the skimmer devices described with reference to FIGS. 3-6 can, in some embodiments, overcome or provide solutions to one or more of the deficiencies of the overflow skimmer devices noted above. The embodiments illustrated in FIGS. 3-6 and those described below are not intended to be limiting, and modifications, variations, combinations, etc., are possible and within the scope of this disclosure. As will be discussed in more detail below, these aquarium skimmer devices, systems, and methods can be used to clean the surface of an aquarium efficiently and effectively.

Figure 3:
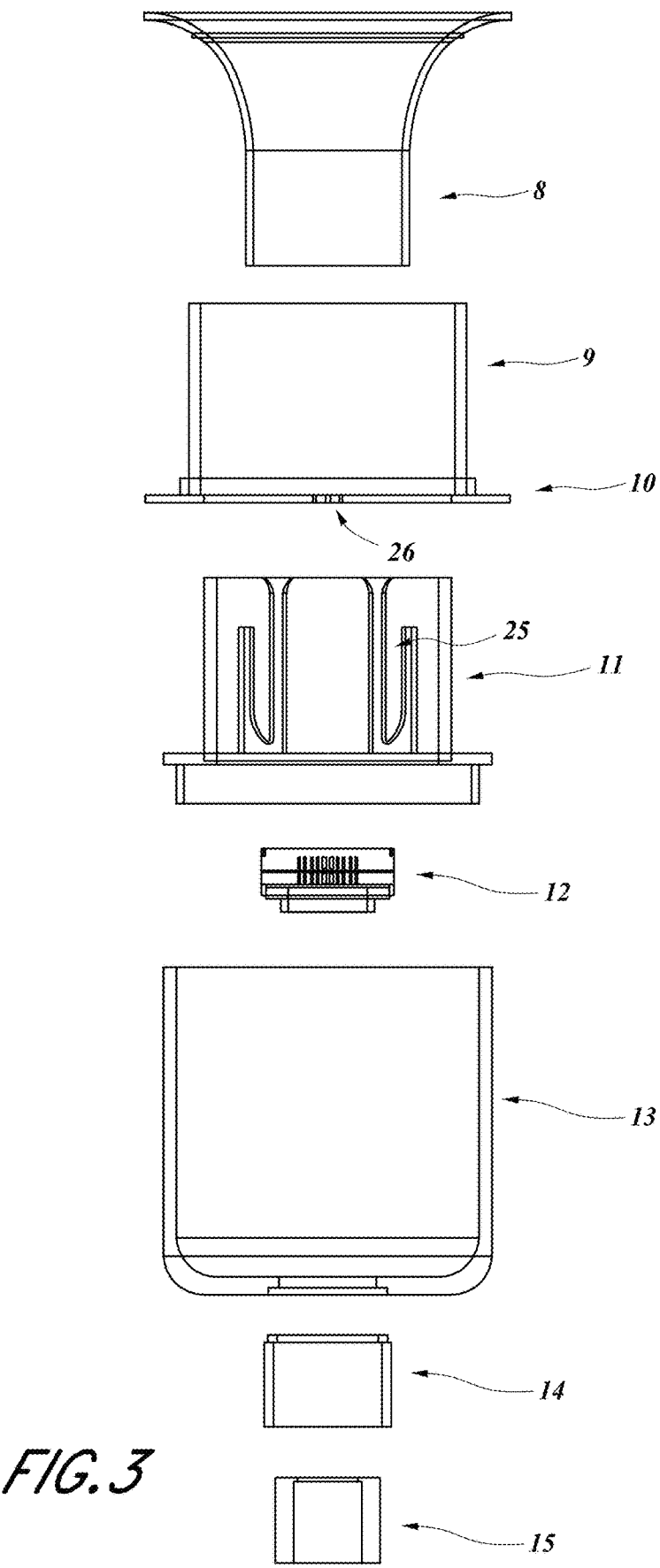
FIG. 3 is an exploded view of an aquarium water skimmer device as described herein.
Figure 4:
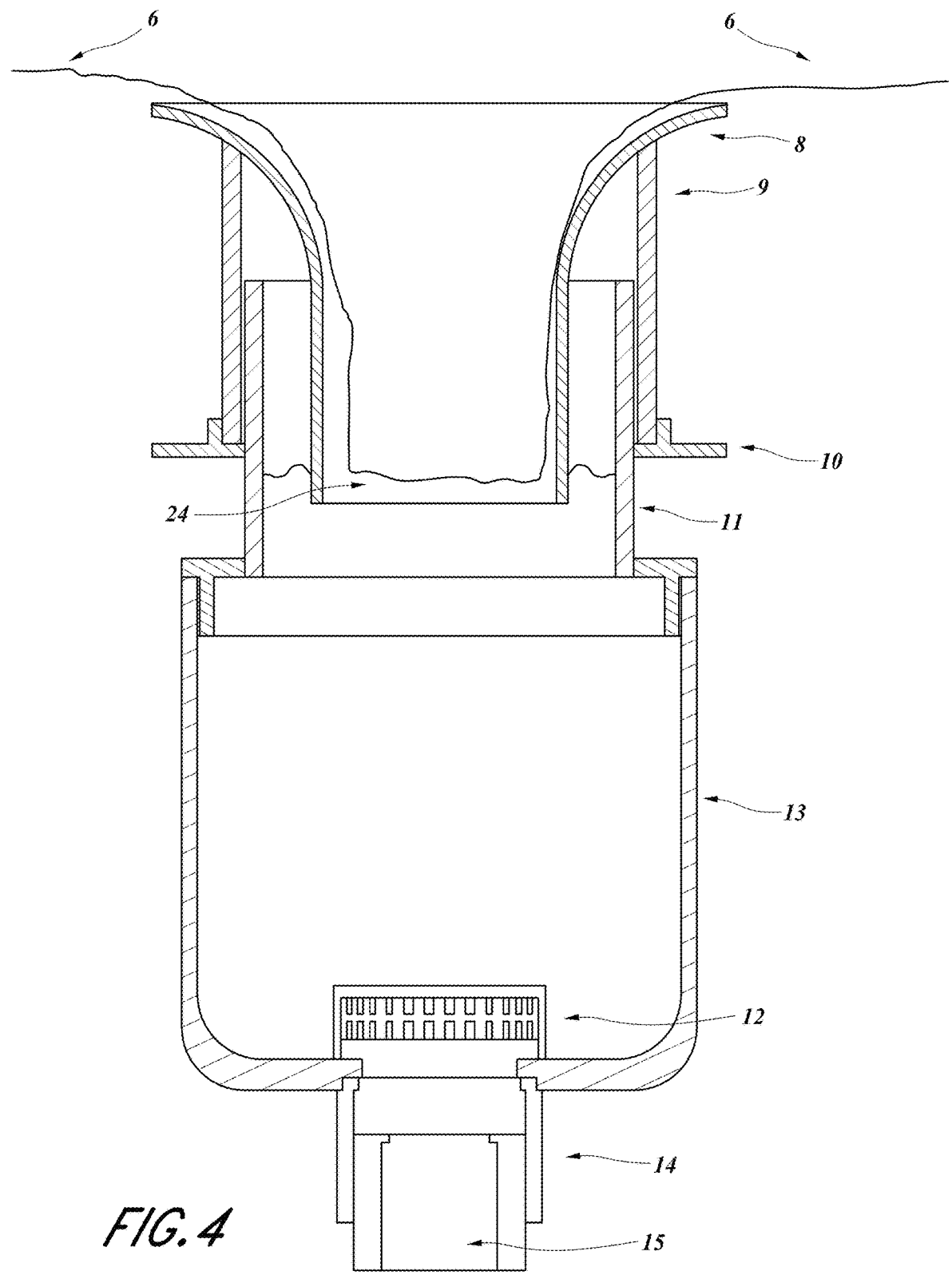
FIG. 4 is a cross-sectional view of the aquarium water skimmer device of FIG. 4 shown in an assembled configuration.

FIG. 3 is an exploded view of an aquarium water skimmer device, and FIG. 4 is a cross-sectional view of the aquarium water skimmer device of FIG. 4 shown in an assembled configuration. As shown in FIGS. 3 and 4, in the illustrated embodiment, the skimmer device comprises a funnel assembly (which includes a funnel 8, a funnel sleeve 9, and a funnel ring 10), a funnel holder 11, a filter body assembly (which includes a filter body 13, a floss guard 11, and a throat 14), and a throat adapter 15. In some embodiments, one or more of these features can be combined with another feature. In some embodiments, not all features are required—modifications, omissions, and substitutions can be made based on the principles described herein and are intended to fall within the scope of this disclosure.

In some embodiments, the funnel assembly (which can include the funnel 8, the funnel sleeve 9, and the funnel ring 10) is configured to freely float up and down with respect to the funnel holder 11 into which it is received. This allows the funnel assembly to place itself just below the water surface, even when other components of the skimmer device, such as the filter body 13 are fixed in place with respect to the aquarium. An advantage to this arrangement is that the funnel 8 remains advantageously positioned with respect to the surface of the water in the aquarium even if the water level in the aquarium changes.

For example, the funnel 8 can be configured to be received within and support by the funnel sleeve 9, as shown, for example, in FIG. 4. The funnel ring 10 can be attached, for example, fixedly attached or integrally formed with, the funnel sleeve 9. In some embodiments, the funnel ring 10 includes protrusions 26 or guides that are configured to slidingly engage with slots 25 or grooves formed in or on the funnel holder 11. In some embodiments, these features can be reversed. For example, the funnel ring 10 can include slots or grooves and the funnel holder 11 can include protrusions or guides. In any event, in general, the funnel holder 11 and the funnel ring 10 are configured to provide sliding movement between the two in a direction that is generally aligned with the longitudinal axis of the device, which during use, is generally oriented along the direction of gravity. This allows the funnel assembly (e.g., the funnel 8, the funnel sleeve 9, and the funnel ring 10) to float or otherwise adjust up and down with changes in the water level in the aquarium and with respect to the funnel holder 11.

As best shown in FIG. 4, which illustrates the skimmer device in an assembled configuration and further shows the water level 6 within the aquarium, the wide opening of the funnel 8 is generally positioned just beneath the water surface. For example, in some embodiments, the funnel 8 is desirably positioned such that the wide opening of the funnel is approximately 0.125, 0.25, 0.375, 0.5, 0.625, 0.75, 0.875, 1, 1.125, 1.25, 1.375, 1.5, 1.625, 1.75, 1.875, or 2 inches below the water level 6 in the aquarium. And, as noted above, the position of the funnel 8 is configured to adjust up and down to generally maintain this distance even as the water level in the aquarium changes. In some embodiments, the level at which the funnel assembly floats below the water level 6 in the aquarium can be configured by adjusting the weight, shape, and/or buoyancy of the funnel assembly or components thereof.

As illustrated in FIG. 4, this causes water to fall into and through the funnel 8 and into the device. Further, owing at least partially to the surface tension of the water, debris or other items floating on the surface of the water are pulled into the device, even from positions that are not located immediately above the funnel 8. In some embodiments, this configuration can advantageously allow enough water into the device so that little air travels through the power head 22 (see FIG. 6) or other water pump attached to the device.

In some embodiments, the funnel 8 will not be so deep relative to the water level 6 that it completely fills with water. It is desirable that the water falling through the funnel generally conform to the shape of the funnel as shown in FIG. 4. This placement of the funnel 8 to just beneath the water surface 6 allows for water to fall into the skimmer device, since the water level in the device 24 will be lower than the water level 6 in the aquarium.

Funnels with different profiles or shapes can be used. In some embodiments, the profile of the funnel 8 can contribute to the flow of water through the funnel 8, and different profiles can produce different effects. For example, certain profiles may induce a smooth or laminar flow, while other profiles may induce a more turbulent flow. Certain profiles may even produce a vortex that swirls the water as it flows through the funnel 8. In some embodiments of the skimmer device, the funnel 8 may be removable and replaceable with a funnel 8 having a different profile to produce a different effect. Funnels shaped like an actual vortex (e.g., described by the formula $y=-1/x$) may be advantageous because this shape may not require any rotational movement of the water to produce a vortex. In some embodiments, a turbulent or swirling flow through the funnel may also be desirable. In some embodiments, a goal of the funnel 8 is to get the floating debris on the surface to enter the device. Therefore, different funnel profiles may be needed for different situations.

A funnel 8 having a profile that approximates the shape of the $-1/x$ curve may be advantageous in that the transition from the wide opening of the funnel 8 to the narrow opening of the funnel is very smooth and gradual. In such an embodiment, as water flows over the edge of the funnel 8, the funnel 8 initially includes a shallow slope that increases into a much steeper slope in a smooth fashion. Flow through this type of funnel 8 may be smooth and turbulence may be limited. Water not only has high surface tension, but it is also cohesive. The cohesive property of the water causes it to adhere to the path created by the profile of the funnel 8. If the profile is gradual to steep, then the water will be encouraged to follow the profile. This is similar to the effect that a swirling vortex created by rotational flow of water.

FIG. 5B illustrates another profile or shape for the funnel 107 of the skimmer device 100 according to some embodiments. In this example, the profile includes an upper portion 133, a middle portion 135, and a lower portion 137. The upper portion 133 includes an initially steep slope from the wide opening 111. The slope becomes less steep in the middle portion 135, and then steep again in the lower portion 137. This profile may be considered more of a traditional funnel. This profile may cause the water to crash into and through the narrow opening 113. The effect can be very similar to a toilet flush, where the turbulence allows for debris to fall into the narrow opening 113.

Figure 6:
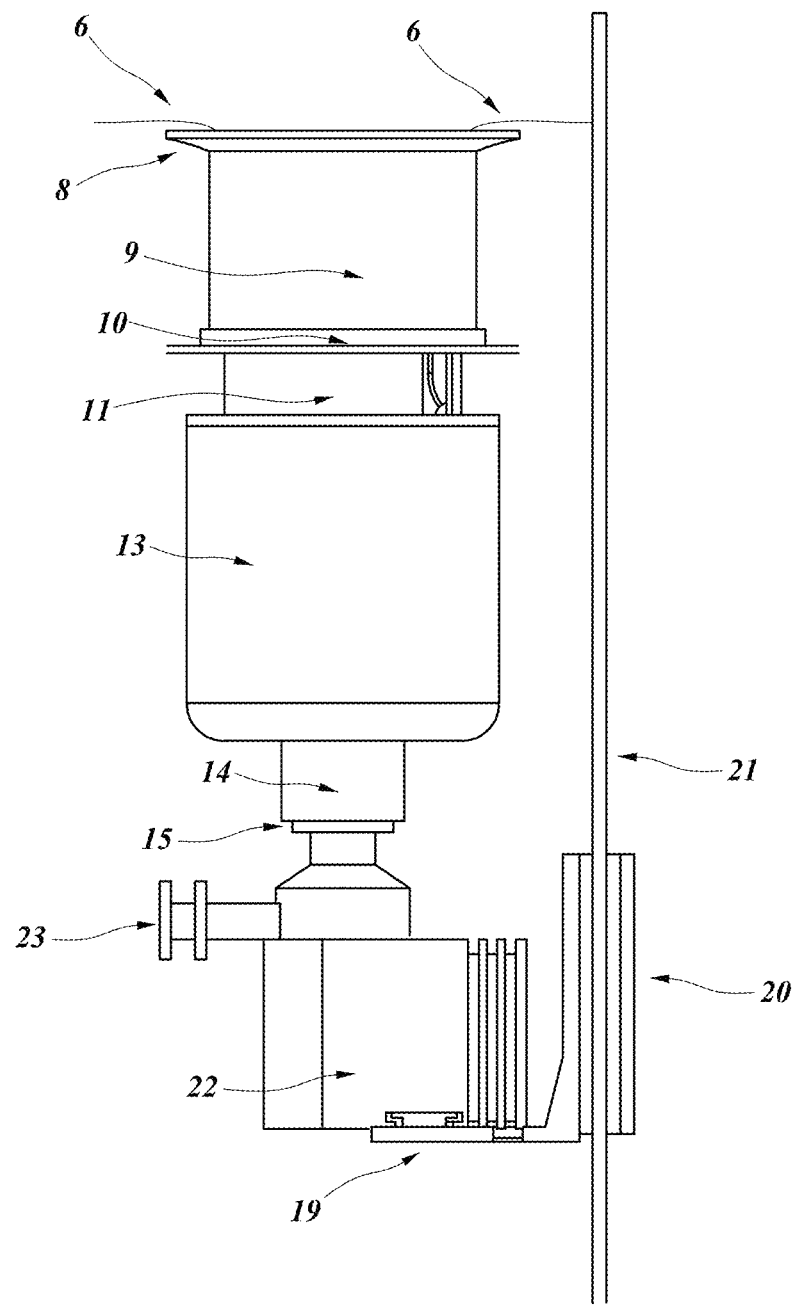
FIG. 6 illustrates the aquarium water skimmer device if FIG. 4 installed on an aquarium wall using the attachment device of FIG. 5 and further connected to a powerhead water pump, according to one embodiment.

As shown in FIGS. 3 and 4, below the funnel assembly, the skimmer device includes the filter body assembly (which includes a filter body 13, a floss guard 11, and a throat 14), and a throat adapter 15, which can be configured to attach the skimmer device to a power head 22 or other pump assembly as shown in FIG. 6.

The filter body assembly is generally configured to provide filtration and/or cleaning of the water that passes therethrough. For example, in some embodiments, the filter body 13 is configured to receive one or more of several types of filter media, which can consist of floss, sponges, balls, carbon, NeoLite, etc. The floss guard 12 can be positioned near an outlet of the filter body 13 and configured to retain the filter media within the filter body 13 while still allowing water to pass there through. The floss guard 12 can comprise a grate, net, or other such structure that is configured retain the filter media within the filter body 13 while still allowing water to pass there through.

As shown in the illustrated embodiment, the funnel holder 11 can be configured to fit onto the top of the filter body 13.

In some embodiments, the funnel holder 11 attaches to the filter body 13 through a friction fit or through other mechanisms, such as threading. In some embodiments, the funnel holder 11 can be removed from the filter body 13 to allow access to the filter medium within the filter body 13. This advantageously allows the filter medium to be changed as needed.

The throat 14 can extend downwardly from the filter body 13. In some embodiments, a throat adapter 15 is included. The throat 13 and/or the throat adapter can be configured to attach to an intake of a water pump or power head 22, for example, as shown in FIG. 6. Various water pumps or power head can be used. As one example, power heads provided by Marineland can be used. The water pump or power head 22 is configured to pump the water that falls through the funnel 9 and into the filter body 13 through the device where it can be cleaned or filtered by the filter media in the filter body 13. The water pump or power head 22 then exhausts the water back through back into the aquarium.

Figure 5:
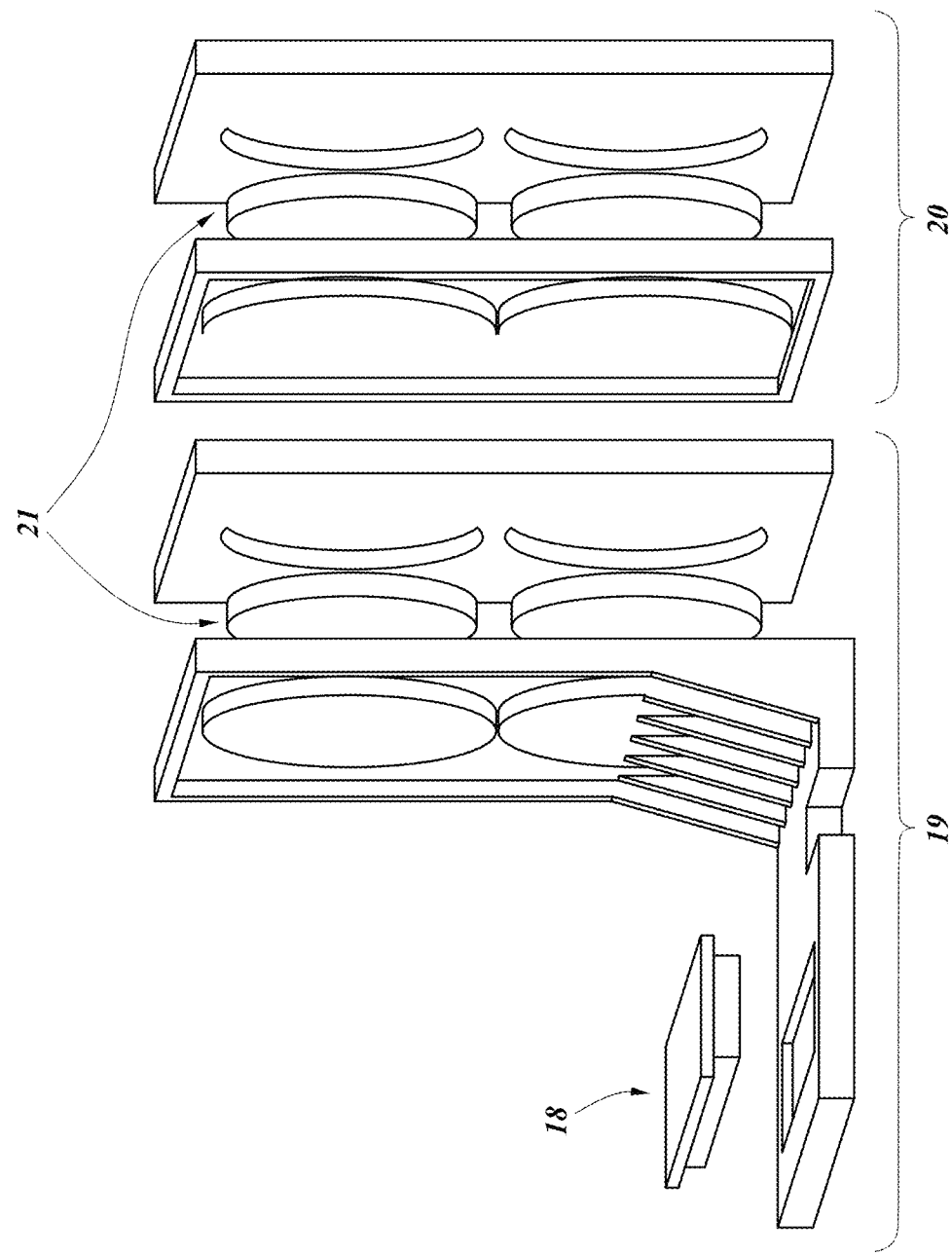
FIG. 5 illustrates an example attachment device for an aquarium water skimmer device, wherein the attachment device is configured as a magnetic stand that may be used to secure the aquarium water skimmer device to a wall of an aquarium.

FIG. 5 illustrates an example attachment device for an aquarium water skimmer device, wherein the attachment device is configured as a magnetic stand that may be used to secure the aquarium water skimmer device to a wall of an aquarium. In the illustrated configuration, the attachment device comprises a stand 19 and a stand back 20. Each of the stand 19 and the stand back 20 can include magnets 21 that attach the stand 19 to the stand back 20. During use, the stand 19 can be positioned on an inner side of an aquarium wall, and the stand back 20 can be positioned on an outer side of the aquarium wall, opposite the stand 19. The magnets can hold the stand 19 and the stand back 20 together, through the aquarium wall, fixing the attachment device to the aquarium wall. The position of the attachment device on the aquarium wall can easily be adjusted up and down.

As shown in FIG. 5, the stand 19 can include a flange configured to support a mount 18. The mount 18 can be configured to attach to and support the skimmer device of FIGS. 3 and 4, for example as shown in FIG. 6. The mount 18 can attach to various portions of the skimmer device or to the water pump or power head 22.

Other mechanism for securing the skimmer device to an aquarium can also be used.

FIG. 6 illustrates the aquarium water skimmer device if FIG. 4 installed on an aquarium wall using the attachment device of FIG. 5 and further connected to a powerhead water pump, according to one embodiment. As shown, the funnel 8 is configured such that it is positioned just below the surface 6 of the water in the aquarium. The skimmer device is supported by the stand 19 and stand back 20, which are magnetically attached to the aquarium wall. The stand 19 supports the power head 22 which is attached to the throat 14 via the throat adapter. Water moving through the device is exhausted back into the aquarium at the power head exhaust 23.

When the water pump or power head 22 is engaged, water can be pulled through the filter body 13. When the skimmer device is installed, this causes water to fall/flow through the funnel 8 of the skimmer device and into the filter body 13. As the water falls/flows through the funnel 8, the surface tension of the water pulls the surface of the water into and through the funnel 8. Debris that is on the surface of the water is pulled along with the water and through the funnel 8 into the filter body 13. In some instances, the water and debris can be accelerated as it falls/flows through the funnel 8. This acceleration may help to drive debris down into the filter body 13.

In the event that debris within the filter body 13 begins to float, it is unlikely that the debris will float back up through the funnel 8. This can be because the narrow opening 113 is sufficiently small and because the water level in the device is lower than the water level within the aquarium.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the disclosure disclosed herein. Consequently, it is not intended that this disclosure be limited to the specific embodiments disclosed herein, but that it cover all modifications and alternatives coming within the true scope and spirit of the disclosure as embodied in the attached claims. Applicant reserves the right to submit claims directed to combinations and sub-combinations of the disclosed disclosures that are believed to be novel and non-obvious. Disclosures embodied in other combinations and sub-combinations of features, functions, elements and/or properties may be claimed through amendment of those claims or presentation of new claims in the present application or in a related application. Such amended or new claims, whether they are directed to the same disclosure or a different disclosure and whether they are different, broader, narrower or equal in scope to the original claims, are to be considered within the subject matter of the disclosures described herein.

What is claimed is:

1. An aquarium skimmer device, comprising:
   a filter body that attaches to a water pump or power head, wherein the filter body is configured to hold a filter medium for filtering water that passes through the filter body;
   a funnel holder attached to or positioned on the filter body, the funnel holder comprising a first hollow cylindrical body extending along a vertical axis; and
   a funnel assembly removably received on the funnel holder, the funnel assembly comprising;
   a funnel sleeve comprising a second hollow cylindrical body extending along the vertical axis and positioned over the first hollow cylindrical body such that the funnel sleeve slides up and down along the vertical axis relative to the first hollow cylindrical body, and
   a funnel received by an upper end of the second hollow cylindrical body of the funnel sleeve, the funnel consisting of an upper opening and a lower opening connected by a continuous surface, the upper opening larger than the lower opening, and the lower opening positioned within the second hollow cylindrical body, wherein the funnel sleeve and the funnel are configured to float up and down along the vertical axis with respect to the funnel holder with changes in water level, wherein an opening of the funnel is positioned one inch or less below a surface of the water.

2. The device of claim 1, wherein the funnel self-positions relative to the surface of the water.

3. The device of claim 1, wherein the upper opening of the funnel raises above the surface of the water when the water pump or power head is deactivated, thus disallowing debris in the filter body from escaping the filter body.

4. The device of claim 1, further comprising grooves in the funnel holder configured to stabilize the funnel assembly.

5. The device of claim 1, further comprising grooves in the funnel holder that allow the funnel assembly to ride in the grooves, so the funnel assembly is locked onto the funnel holder.

6. The device of claim 1, further comprising one or more suction cups configured to attach the device to an aquarium wall.

7. The device of claim 1, further comprising a magnetic attachment device configured to attach the device to an aquarium wall.

8. The device of claim 1, wherein the water pump or power head includes an intake that is attached to an outlet of the filter body.

\* \* \* \* \*